United States Patent
Han et al.

(10) Patent No.: US 9,973,603 B2
(45) Date of Patent: May 15, 2018

(54) ELECTRONIC DEVICE INCLUDING FLEXIBLE DISPLAY

(71) Applicant: Samsung Electronics Co., Ltd., Gyeonggi-do (KR)

(72) Inventors: Byung Gon Han, Gyeonggi-do (KR); Seo Yeon Park, Gyeonggi-do (KR); Young Seok Park, Seoul (KR); Young Woo Jung, Gyeonggi-do (KR); Won Geun Shim, Gyeonggi-do (KR); Sung Chul Park, Seoul (KR); Jeong Gyu Jin, Gyeonggi-do (KR); Ho Chul Hwang, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days. days.

(21) Appl. No.: 15/340,302

(22) Filed: Nov. 1, 2016

(65) Prior Publication Data

US 2017/0126866 A1   May 4, 2017

(30) Foreign Application Priority Data

Nov. 3, 2015   (KR) .................. 10-2015-0154055

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01); *G06F 1/1656* (2013.01); *G06F 1/1673* (2013.01)

(58) Field of Classification Search
CPC .. H04M 1/0268; G06F 1/1652; G06F 1/1656; G06F 1/1673
USPC .............. 455/550.1, 566, 575.1; 379/428.01, 379/428.03, 433.01
See application file for complete search history.

(56) References Cited

FOREIGN PATENT DOCUMENTS

KR        10-0625786 B1      9/2006
KR        20140101611    *   8/2014

* cited by examiner

*Primary Examiner* — Raymond Dean
(74) *Attorney, Agent, or Firm* — Cha & Reiter, LLC

(57) ABSTRACT

Disclosed is an electronic device includes a flexible display, a support structure that supports the flexible display and a housing, into which the flexible display and the support structure are inserted. When the support structure is inserted into the housing, the flexible display is inserted into the housing together with the support structure while being wound in a specific direction. When the support structure extends outside the housing, the flexible display is deployed so that the flexible display is substantially flat.

20 Claims, 10 Drawing Sheets

ELECTRONIC DEVICE INCLUDING FLEXIBLE DISPLAY

CLAIM OF PRIORITY

This application claims the benefit under 35 U.S.C. § 119(a) of a Korean patent application filed on Nov. 3, 2015 in the Korean Intellectual Property Office and assigned Serial number 10-2015-0154055, the entire disclosure of which is hereby incorporated by reference.

TECHNICAL FIELD

The present disclosure relates to an electronic device including a flexible display.

BACKGROUND

Various types of portable electronic devices, such as smartphone, tablet PCs, and smart watches, have been developed and used. The electronic devices may be implemented in various forms and sizes according to the corresponding designs of the electronic devices. In recent years, flexible displays that may be deflected or bent to various degrees have been developed for use in these various electronic devices.

However, because electronic devices, such as smartphones and tablet PCs, have been traditionally designed with rigid displays, flexible displays cannot simply replace the rigid displays and doing so would negate the advantages of flexible displays. Accordingly, new and novel designs of electronic devices to take full advantage of flexible displays are required.

SUMMARY

Aspects of the present disclosure are to address at least the above-mentioned problems and/or disadvantages and to provide at least the advantages described below. Accordingly, an aspect of the present disclosure is to provide an electronic device that may receive a flexible display therein and may protrude and deploy the flexible display if necessary.

The present disclosure also provides an electronic device that may conveniently deploy a flexible display by using a mechanical force (for example, a resilient force) of a resilient member or a shape memory alloy.

In accordance with an aspect of the present disclosure, there is provided an electronic device including a cylindrical housing having a transparent window on at least a portion of an outer surface thereof, a first member adapted to be insertable into an opening of the cylindrical housing, and a flexible display, at least a portion of which is coupled to the first member. When the first member is inserted into the opening of the cylindrical housing, the flexible display is wound about the first member, a portion of the flexible display outputs a first image through the transparent window, and when the first member is extended outside the cylindrical housing, the flexible display is deployed to be substantially flat to display a second image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
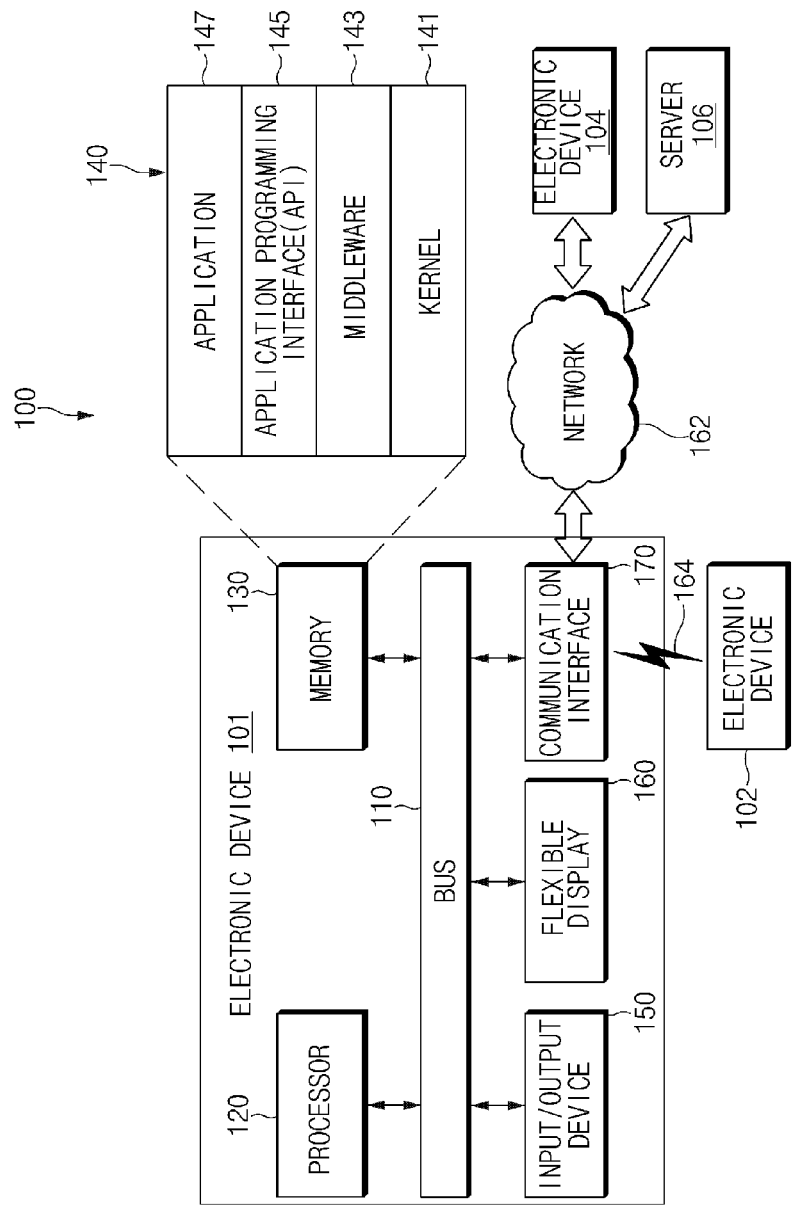
FIG. 1 illustrates an electronic device in a network environment according to one embodiment of the present disclosure.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have," "may have," "include," "comprise," "may include" and "may comprise" used herein indicate existence of corresponding features (for example, elements such as numeric values, functions, operations, or components) but do not exclude presence of additional features.

In the disclosure disclosed herein, the expressions "A or B," "at least one of A or/and B," "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. As another example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for," "having the capacity to," "designed to," "adapted to," "made to," or "capable of." The term "configured to (or set to)" may not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to one or more embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In one or more embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device in a network environment according to one embodiment of the present disclosure.

Referring to FIG. 1, there is illustrated an electronic device 101 in a network environment 100 according to one or more embodiments. The electronic device 101 may include a bus 110, a processor 120, a memory 130, an input/output (I/O) interface 150, a display 160, and a communication interface 170. According to an embodiment, the electronic device 101 may not include at least one of the above-described elements or may further include other element(s).

For example, the bus 110 may interconnect the above-described elements 120 to 170 and may include a circuit for conveying communications (e.g., a control message and/or data) among the above-described elements.

The processor 120 may include one or more of a central processing unit (CPU), an application processor (AP), or a communication processor (CP). The processor 120 may perform, for example, data processing or an operation associated with control and/or communication of at least one other element(s) of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to other element(s) of the electronic device 101. Furthermore, the I/O interface 150 may output an instruction or data, received from other element(s) of the electronic device 101, to a user or another external device.

A flexible display 160, for example, may include a liquid crystal display (LCD), a light emitting diode (LED) display, an organic light emitting diode (OLED) display, a microelectromechanical system (MEMS) display, or an electronic paper display. The flexible display 160, for example, may display various contents (for example, a text, an image, a video, an icon, a symbol). The flexible display 160 may include a touch screen and, for example, may receive a touch, a gesture, a proximity, or a hovering input using an electronic pen or a part of the body of the user.

In one or more embodiments, the flexible display 160 may be curved or deployed in various shapes. For example, the flexible display 160 may be inserted into a case or a housing of the electronic device 101 while being curved. Descriptions of how the flexible display 160 is implemented in the electronic device 101 may be provided through FIGS. 2 to 9.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 164. The local area network 164 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to one or more embodiments, all or a portion of operations that the electronic device 101 will perform may be executed by another or plural electronic devices (e.g., the external electronic devices 102 and 104 or the server 106). According to an embodiment, in the case where the electronic device 101 executes any function or service automatically or in response to a request, the electronic device 101 may not perform the function or the service internally, but, alternatively additionally, it may request at least a part of a function associated with the electronic device 101 at other device (e.g., the external electronic device 102 or 104 or the server 106). The other electronic device (e.g., the external electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
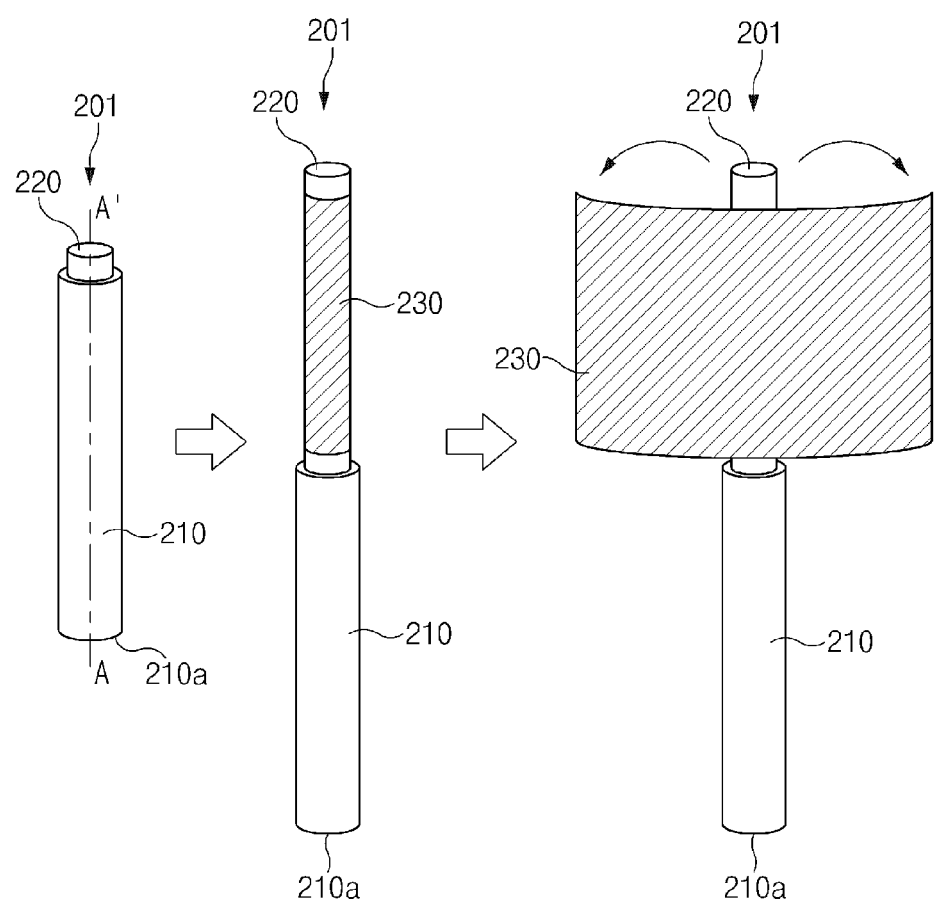
FIG. 2 illustrates a configuration and a conversion operation of an electronic device according to one embodiment of the present disclosure.

FIG. 2 illustrates a configuration and a conversion of an electronic device according to one embodiment of the present disclosure. In one or more embodiments, the electronic device 201 may be the electronic device 101 of FIG. 1.

Referring to FIG. 2, the electronic device 201 may include a housing 210, a first member 220, and a flexible display 230.

The housing 210 may be a hollow and cylindrically shaped structure that has an opening adapted to receive the first member 220 and flexible display 230. At least a portion of first member 220 and the flexible display 230 may be received in the opening of the housing 210. Although FIG. 2 exemplarily illustrates that the housing 210 is cylindrical, the present disclosure is not limited thereto. For example, the housing 210 may have various cross-section shapes such as a rectangle or a polygon.

According to one or more embodiments, a first end (for example, a bottom end 210a) of the housing 210 may be closed, and a second end (for example, a top surface) of the housing 210, which is opposite to the first end, may be opened. For example, the second end may be the end through which at least a portion of the first member 220 and the flexible display 230 can be extended outside the housing.

According to one or more embodiments, various configurations or components that are necessary for the electronic device 201 may be provided inside or outside the housing 210. For example, the housing 210 may include a battery, a communication module, and a user interface (for example, a physical button or a touch button) therein.

According to one or more embodiments, the housing 210 may further include a resilient member for extending the first member 220 and the flexible display 230 to the outside of the housing. The resilient member may be arranged adjacent to the bottom end 210a of the housing 210, and may be connected to a lower end of the first member 220, for example the end of the first member 220 that is adjacent to the bottom end 210a of the housing 210 when the first member 220 is fully inserted into the opening of the housing 210. The resilient member may provide a resilient force for the first member 220, and the first member 220 may extend to the outside of the housing 210 using the resilient force. When the first member 220 extends to the outside of the housing 210 by a specific distance or more, the flexible display 230 may be deployed.

According to one or more embodiments, a transparent substrate may be used to form at least a portion of an outer surface of the housing 210. Accordingly, a transparent window may be provided for the housing 210. At least a portion of the flexible display 230 may be exposed through the transparent window. Additional information on the transparent window may be provided with reference to FIG. 6.

According to one or more embodiments, the housing 210 may have a cylindrical shape that extends along an axis A-A', such that the axis A-A' is centered within the housing 210. The first member 220 and the flexible display 230 may be disposed to move along the axis A-A' in order to extend to the outside of the housing 210. In one or more embodiments, the flexible display 230 may be deployed in a direction that is perpendicular to the axis A-A'.

The first member 220 may be fixed to the flexible display 230 and support the flexible display 230. The first member 220 may be configured to move along the axis A-A' while at least a portion of the first member 220 is inside the housing 210. In one or more embodiments, the first member 220 is in a first state when the whole first member 220 is inserted into the housing 210, so that the flexible display 230 is stored in the housing 210. Alternatively, the first member 220 may be in a second state where at least a portion of the first member 220 is exposed to the outside of the housing 210 so that the flexible display 230 may be deployed.

When the first member (also called a "support structure") 220 is inserted into the housing 210 (the first state), the flexible display 230 may wound about the support structure 220. When the support structure 220 extends the outside of the housing 210 by a specific distance or more (the second state), the flexible display 230 may be deployed.

In one or more embodiments, the support structure 220 may act as an axis on which the flexible display 230 is wound. For example, the flexible display 230 may be inserted into the housing 210 after being wound clockwise or counterclockwise about the support structure 220.

In one or more embodiments, the support structure 220 may protrude to the outside by a resilient force of the resilient member inside the housing. The resilient member may be connected to a surface on the exterior of the housing 210. For example, the resilient member may be connected to a physical button on an exterior surface of the housing 210. When the user pushes the physical button, a hook that keeps the resilient member in a compressed state may be released, so that the resilient force stored in the resilient member may be transferred to the support structure 220 in order for the support structure 220 to extend to the outside of the housing 210 along with the flexible display 230.

The flexible display 230 may output various contents such as an image or a text. When the flexible display 230 is inserted into the housing 210, it may be compressed, i.e. wound around the support structure 220. When the flexible display 230 extends the outside of the housing 210, it may be deployed in a specific direction (for example, a direction that is perpendicular to the axis A-A'). When the flexible display 230 is deployed, it may be unwound and assume a substantially flat shape.

In one or more embodiments, the flexible display 230 may include a shape memory alloy. For example, the flexible display 230 may include a shape memory alloy in the rear surface (a surface that is opposite to the active surface of the flexible display on which contents are displayed) of the flexible display 230. The shape memory alloy may remember at least one shape and is adapted to maintain a shape of the flexible display 230. For example, the shape memory alloy may remember a deployed state of the flexible display 230. When the flexible display 230 extends outside the housing 210, the flexible display 230 may be deployed by a resilient force of the shape memory alloy to assume, for example, a substantially flat shape.

In one or more embodiments, when the support structure 220 and flexible display 230 are at least partially inserted into the housing 210 (the first state), a first image may be displayed by the flexible display 230 through the transparent window (not illustrated) of the housing 210. In one or more embodiments, when the support structure 220 and flexible display 230 are at least partially extended outside the housing 210 (the second state), the flexible display 230 may be deployed to display a second image. The first image may be configured to display image data corresponding to an area that is smaller than the second image. In one or more embodiments, the electronic device 201 may further include a second member (not illustrated) that is configured to maintain the shape of at least a portion of the flexible display 230. The second member may prevent the flexible display 230 from returning to a spiral shape for winding around the support structure 220 while being deployed. The second member may be fixed to a peripheral area (for example, a bezel area at a lower end of the screen) of the flexible display 230.

In one or more embodiments, when the user is partaking in certain activities, for example, in sports or travels, he or she may use the electronic device 201 after inserting the flexible display 230 in the housing 210. In contrast, when the user is relatively sedentary, for example, in a rest state, he or she may use the flexible display 230 after deploying the flexible display 230. For example, when the user runs or rides a bicycle, he or she may listen to music or photograph an image by using the electronic device 201 in a state where the flexible display 230 is fully inserted and stored in the housing 210. While taking a rest after exercising, the user may watch a music video or a movie or perform web surfing after deploying the flexible display 230.

Figure 3:
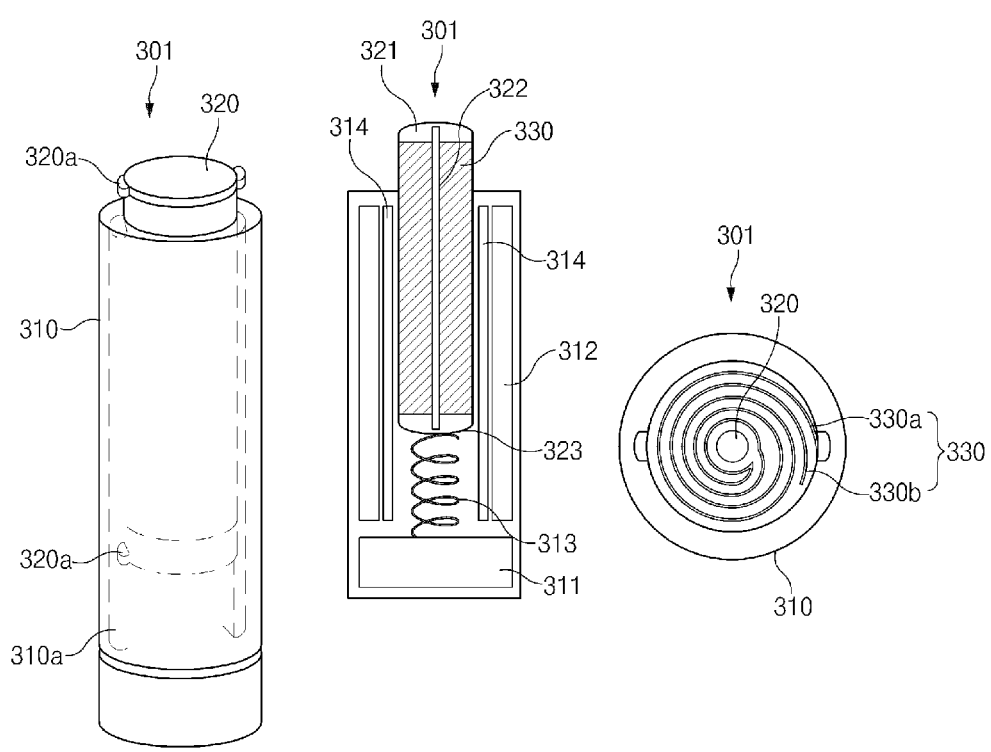
FIG. 3 illustrates an inner structure of a housing according to one embodiment of the present disclosure.

FIG. 3 illustrates an inner structure of a housing according to one embodiment of the present disclosure. In one or more embodiments, the electronic device 301 may be the electronic device 101 of FIG. 1.

Referring to FIG. 3, the electronic device 301 may include a housing 310, a support structure 320, and a flexible display 330. The housing 310 may receive the support structure 320 and the flexible display 330 in the interior thereof.

The housing 310 may include a battery 311 and an internal structure 312 in the interior thereof. The battery 311 may be arranged at a lower end (the end that is opposite to the end of the housing 310 from which the support structure 320 and the flexible display 330 extends) of the housing 310. The battery 311 may supply electric power that is necessary for driving the electronic device 301. The internal structure 312 may include a flexible printed circuit board (FPCB) on which a communication module, a processor, a memory, and the like are mounted, a vibrational motor, and a speaker.

According to one or more embodiments, the housing 310 may include a resilient member 313. The resilient member 313 may be connected to the lower end (the end that is opposite to the end of the support structure 320 from which the support structure 320 and the flexible display 330 extends) of the support structure 320. When extended, the resilient member 313 may push the support structure 320 and the flexible display 330 to the outside of the housing 310 by the resilient force stored in the resilient member 313 when the resilient member 313 is compressed.

In one or more embodiments, the resilient member 313 may be connected to a physical button on the exterior of the housing 310. The physical button may be connected to a hook that maintains the compressed state of the resilient member 313. If the user pushes the physical button, the hook may be rotated about a fixing pin and the compressed resilient member 313 may be uncompressed. When uncompressed, the resilient member 313 may push the support structure 320 and the flexible display 330 to the outside of the housing 310. In another embodiment, the support structure 320 and the flexible display 330 may extend to the outside by an electrical motor powered by the battery 311.

In one or more embodiments, the housing 310 may include a soft material 314 on an inner wall thereof for protecting the flexible display 330. The soft material 314 may protect the flexible display 330 while the flexible display 330 is inserted into the housing 310 or when the flexible display extends to the outside of the housing 310. Further, the soft material 314 may prevent scratches on the flexible display 330.

In one or more embodiments, the housing 310 may include a movement guide 310a. The movement guide 310a may provide a path along which the support structure 320 may move in the housing 310. The movement guide 310a may be adapted to correspond to a guide hook 320a mounted on the support structure 320.

The support structure 320 may fix and support the flexible display 330. The support structure 320 may have two ends 321 and 323 on which the flexible display 330 is not wound. These two ends 321 and 323 may have diameters that are substantially equal or greater to the diameter of the flexible display 330 when the flexible display 330 is wound about the support structure 320. The upper end 321 of the support structure 320 may prevent the flexible display 330 from being scratched. In one or more embodiments, the upper end 321 may include at least one guide hook 320a for cooperating with the movement guide 310a.

The lower end 323 of the support structure 320 may be connected to the resilient member 313. In one or more embodiments, the lower end 323 may include at least one guide hook 320a for cooperating with the movement guide 310a.

An intermediate part 322 of the support structure 320 may be disposed between the two ends 321 and 323 and may be fixed to the flexible display 330 so that the flexible display 330 winds about the intermediate part 322. The diameter of the intermediate part 322 of the support structure 320 may be smaller than those of the upper end 321 or a lower end 323 of the support structure 320.

The flexible display 330 may be compressed and inserted into the housing 310 while being wound on the intermediate part 322 of the support structure 320. In one or more embodiments, the location where intermediate part 322 of the support structure 320 is fixed to the flexible display 330 may define a first part 330a (for example, an area on the left side of the intermediate part 322) and a second part 330b (an area on the right side of the intermediate part 322) with respect to the intermediate part 322 of the support structure 320. Although FIG. 3 exemplarily illustrates that both the first part 330a and the second part 330b are wound clockwise, the present disclosure is not limited thereto. For example, both the first part 330a and the second part 330b may be wound counterclockwise. As another example, the first part 330a may be wound in a first direction, and the second part 330b may be wound in a second direction that is opposite to the first direction.

Figure 4:
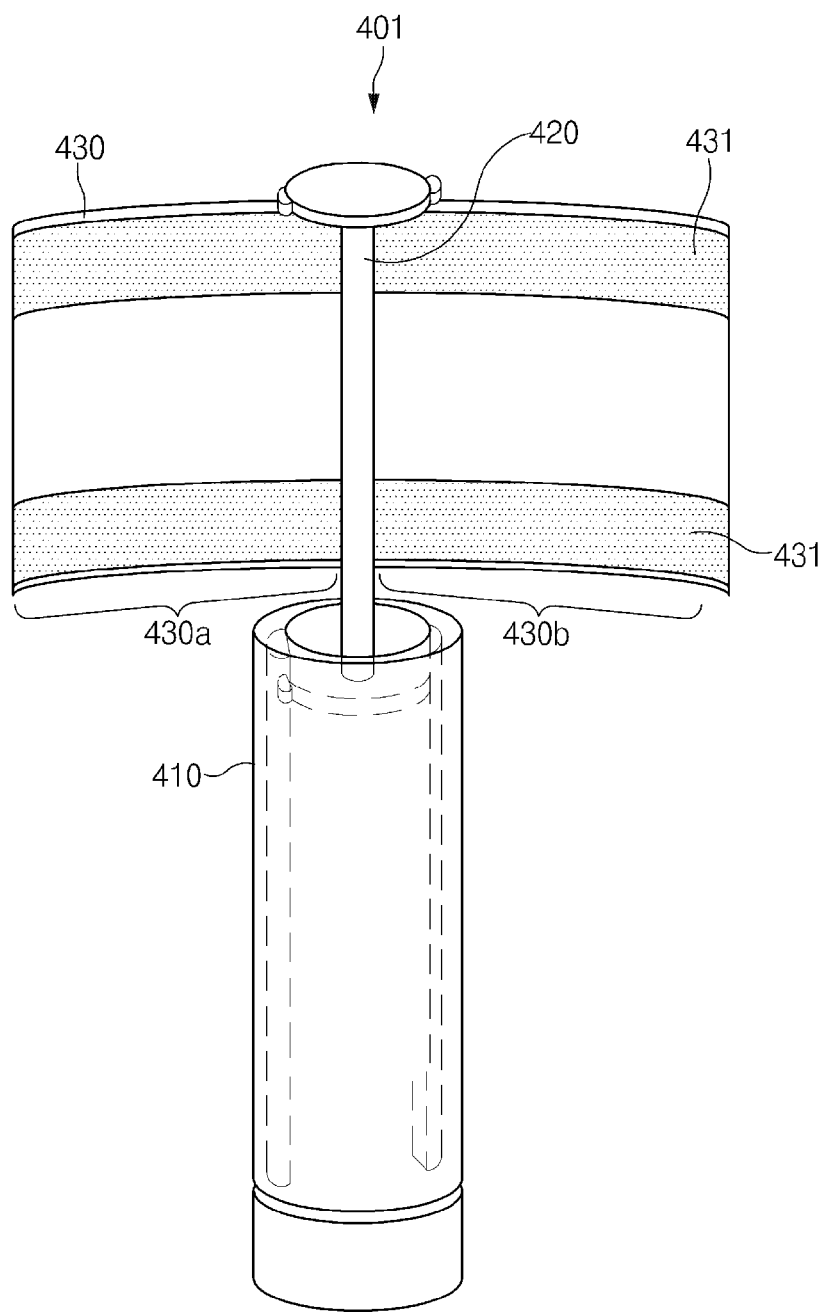
FIG. 4 illustrates a flexible display in a deployed form according to one embodiment of the present disclosure.

FIG. 4 illustrates a flexible display in a deployed form according to one embodiment of the present disclosure. In one or more embodiments, the electronic device 401 may be the electronic device 101 of FIG. 1.

Referring to FIG. 4, the electronic device 401 may include a housing 410, a support structure 420, and a flexible display 430. The flexible display 430 may be fixed to the support structure 420 so that both the flexible display 430 and support structure 420 can be inserted into the housing 410 or to be deployed while protruding from the housing 410. In one or more embodiments, the flexible display 430 may be deployed in a direction that is perpendicular to the lengthwise direction of the housing 410.

The flexible display 430 may include a first part 430a that is deployed in a first direction and a second part 430b that is deployed in a second direction. In one or more embodiments, the first part 430a and the second part 430b may have the same size.

According to one or more embodiments, the first part 430a and the second part 430b may be wound in the same direction or in different directions. In one or more embodiments, both the first part 430a and the second part 430b may be wound about the support structure 420.

According to one or more embodiments, the flexible display 430 may include a shape memory alloy (for example, a leaf spring) 431. The shape memory alloy 431 may be mounted on a surface of the flexible display 430 that is inactive, e.g. mounted on the rear surface of the flexible display 430 that is opposite to the active surface of the flexible display 430 on which contents are displayed. The shape memory ally 431 may also be mounted on an inactive area (for example, the upper or lower bezel) of the flexible display 430.

In one or more embodiments, the shape memory alloy 431 may remember at least one shape. The flexible display 430 may be deployed or wound according to one or more shapes remembered by the shape memory alloy 431.

In one or more embodiments, the shape memory alloy 431 may remember a first shape for when the flexible display 430 is deployed, i.e. the shape memory alloy 431 may remember a substantially flat shape. When the flexible display 430 is inside the housing 410, the shape memory alloy 431 may have a restoring force to change into the first shape. When the flexible display 430 is inside the housing 410, the strength of the housing 410 may be higher than the restoring force of the shape memory alloy 431 so that the flexible display 430 stays wound. When the flexible display 430 protrudes to the outside of the housing 410, the flexible display 430 may be deployed by the restoring force of the shape memory alloy 431.

In one or more embodiments, the shape memory alloy 431 may remember a first shape for when the flexible display 430 is deployed, and a second shape for when the flexible display 430 is wound.

For example, when the user applies a first force to move the flexible display 430 into the housing 410, the flexible display 430 may be compressed from the first shape into the second shape. The flexible display 430 may be inserted into the housing 410 in the second shape. The first force may be a force by which the user curves the flexible display 430 in a specific direction.

As another example, when the user applies a second force in a specific direction to deploy the flexible display 430, the flexible display 430 may be deployed from the second shape into the first shape. The second force may be a resilient force from the resilient member 313 that is transferred from the resilient member 313 compressed in the interior of the housing 410 to the support structure 420 and the flexible display 430.

Figure 5:
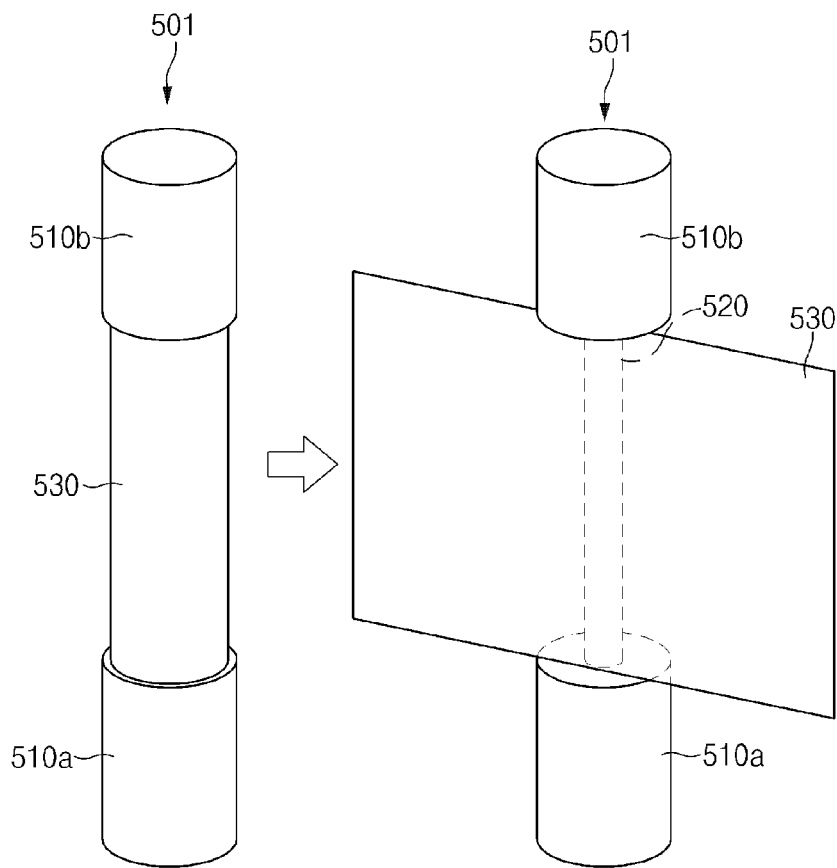
FIG. 5 illustrates an electronic device, a flexible display of which is exposed through an intermediate part of a housing according to one embodiment of the present disclosure.

FIG. 5 illustrates an electronic device, a flexible display of which is exposed through an intermediate part of a housing according to one embodiment of the present disclosure. In one or more embodiments, the electronic device 501 may be the electronic device 101 of FIG. 1.

Referring to FIG. 5, the electronic device 501 may include housings 510a and 510b, a support structure 520, and a flexible display 530. The housings 510a and 510b may receive the support structure 520 and the flexible display 530 in the interiors thereof. As a the upper end 510a and the lower end 510b are separated, the support structure 520 and the flexible display 530 may be exposed.

In one or more embodiments, the user may move at least one of the lower end 510a or the upper end 510b to expose the flexible display 530. For example, the user may move the lower end 510a downwards and move the upper end 510b upwards at the same time to expose the flexible display 530. As another example, the user may grip the lower end 510a, to which the support structure 520 is fixed, and moves the upper end 510b upwards to expose the flexible display 530.

As another example, the user may grip the lower end 510a, to which the support structure 520 is fixed, and press a physical button (not illustrated) to move the upper end 510b upwards. The physical button may be connected to a hook that compresses a resilient member included at the lower end 510a of the housing. If the user pushes the physical button, the compressed resilient member may be released and the upper end 510b of the housing may be pushed upwards by the resilient force stored in the compressed resilient member. As the upper end 510b of the housing is moved, the flexible display 530 may be deployed.

Figure 6:
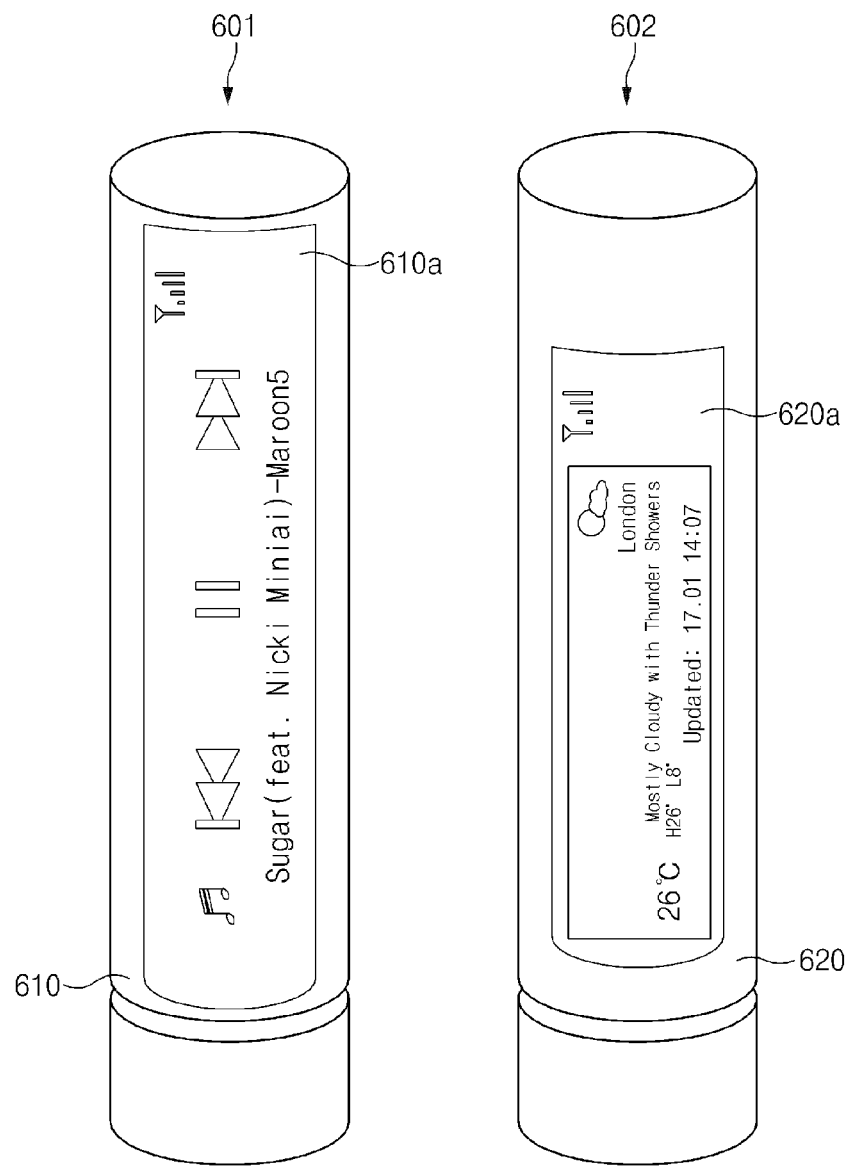
FIG. 6 is an exemplary view for explaining display of information through a housing according to one embodiment of the present disclosure.

FIG. 6 is an exemplary view for explaining display of information through a housing according to one embodiment of the present disclosure. In one or more embodiments, the electronic device 601 or 602 may be the electronic device 101 of FIG. 1.

Referring to FIG. 6, the electronic device 601 may include a housing 610 and a flexible display included in the interior of the housing 610. The housing 610 may include a transparent window 610a. At least a portion of the flexible display inside the housing 610 may be exposed through the transparent window 610a. The transparent window 610a may be made of a transparent material such as transparent glass or transparent plastic.

In the electronic device 601, it may be identified by a sensor (for example, an illumination sensor or a proximity sensor) whether the flexible display is inserted into the housing 610. The electronic device 601 may display contents on a flexible display in a portion of the flexible display that corresponds to the transparent window 610a while the flexible display is inserted in the housing 610.

In one or more embodiments, the transparent window 610a may further include a touch panel. The user may control the electronic device 601 by touching the transparent window 610a. For example, a music playback control button may be displayed on the flexible display corresponding to the transparent window 610a. The user may play or temporarily stop music by touching the transparent window 610a. When the user performs gestures on the transparent window 610a, for example sweeps the transparent window 610a upwards, downwards, leftwards, and rightwards, various operations corresponding to the gestures may be performed.

According to one or more embodiments, a first image that is outputted through the transparent window 610a may be of an area that is smaller than a second image that is outputted while the flexible display is deployed. The user may review simple information (for example, a message or an alarm of a schedule) through the first image.

In another embodiment, unlike the electronic device 601, the electronic device 602 may include a housing 620 that has a separate sub-display 620a in addition to the flexible display. When the flexible display is inserted into the housing 620, the electronic device 602 may activate the sub-display 620a. In contrast, the electronic device 602 may deactivate the sub-display 620a when the flexible display is deployed. When the flexible display is inserted into the housing 620, the user may control the electronic device 602 through the sub-display 620a, and when the flexible display is deployed, the user may control the electronic device 602 though the flexible display.

In one or more embodiments, the electronic device 601 or 602 may perform a communication function such as voice communication or video communication. When a call is received from an external device, the electronic device 601 or 602 may display signal transmission information through the transparent window 610a or the sub-display 620a. When the user pushes a button (for example, a physical button or a touch button), a call may be connected through a speaker and a microphone that are equipped in the housing 610 or 620. In one or more embodiments, the electronic device 601 or 602 may maintain a voice communication state while the flexible display is compressed, and may convert the state of the electronic device 601 or 602 to a video communication state while the flexible display is deployed.

Figure 7A:
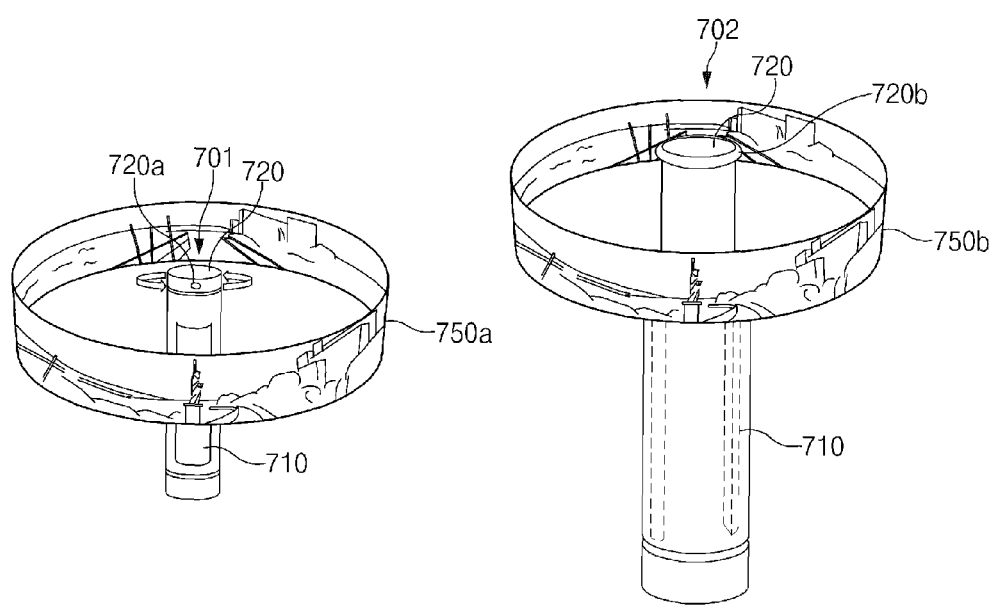
FIG. 7A is an exemplary view illustrating that an image is photographed by using an electronic device according to one embodiment of the present disclosure.

FIG. 7A is an exemplary view illustrating that an image is photographed by using an electronic device according to one embodiment of the present disclosure. In one or more embodiments, the electronic device 701 or 702 may be the electronic device 101 of FIG. 1.

Referring to FIG. 7A, the electronic device 701 may include a camera module 720a. Although FIG. 7A exemplarily illustrates that the camera module 720a is mounted on an upper end of the support structure 720, the present disclosure is not limited thereto. The camera module 720a may be arranged at an upper end part or an intermediate part of the housing 710.

The user may capture a picture or a video by using the camera module 720a. For example, when the user is moving, for example, during exercise or travel, he or she may mount the electronic device 701 on a part of his or her body or an object (for example, a bicycle or a skate board), and may capture picture or video while the flexible display is inside the housing 710. As another example, when the user is in a relatively still state, he or she may capture a picture or a video while deploying the flexible display in order to identify a subject to be photographed through the flexible display. As another example, the user may capture a selfie image while gripping a lower end of the housing 710.

According to one or more embodiments, when the camera module 720a is mounted on an upper end of the support structure 720, a panorama image 750a may be captured while the upper end of the support structure 720 rotates by 360 degrees. The user may grip a lower end of the housing 710, and may conveniently capture the panorama image 750a including objects of the surrounding environment. In one or more embodiments, the panorama image 750a may be transmitted to a peripheral virtualization device (for example, a gear VR), and the user may view a 3-D image using the virtualization device.

The electronic device 702 may include a sensor in pixel (SIP) 720b. A plurality of SIPs 720b may be mounted on an upper end of the support structure 720. Each of the SIPs 720b may collect an image in a specific direction. A processor in the interior of the electronic device 702 may process images collected by the SIPs 720b, and may produce a panorama image 750b. The panorama image 750b may be transmitted to a peripheral virtualization device (for example, a gear VR).

Figure 7B:
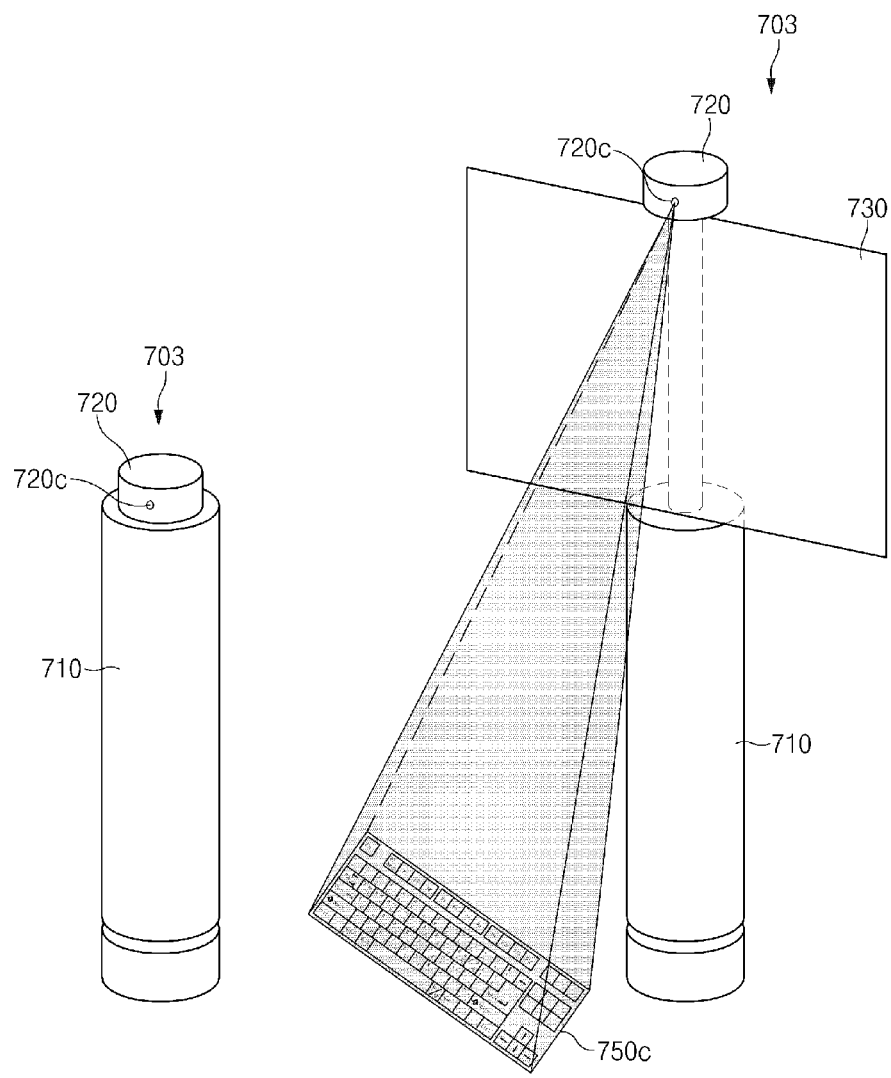
FIG. 7B is an exemplary view of an electronic device including an infrared ray output unit according to one embodiment of the present disclosure.

FIG. 7B is an exemplary view of an electronic device including an infrared ray output unit according to one embodiment of the present disclosure. In one or more embodiments, the electronic device 703 may be the electronic device 101 of FIG. 1.

Referring to FIG. 7B, the electronic device 703 may include a housing 710, a support structure 720, and a flexible display 730. In one or more embodiments, an upper end of the support structure 720 may include an infrared ray output unit (or an infrared ray sensor) 720c.

The infrared ray output unit 720c may output a specific pattern through an infrared ray. For example, the infrared ray output unit 720c may output a keyboard pattern 750c. The user may input various pieces of information such as letters and symbols by using a keyboard pattern 750c. The electronic device 703 may recognize an operation of the user and a change of the keyboard pattern 750c by using the infrared ray output unit 720c or another sensor. Various pieces of information, such as texts and symbols, which are inputted by the user may be outputted on the flexible display 730.

Figure 8:
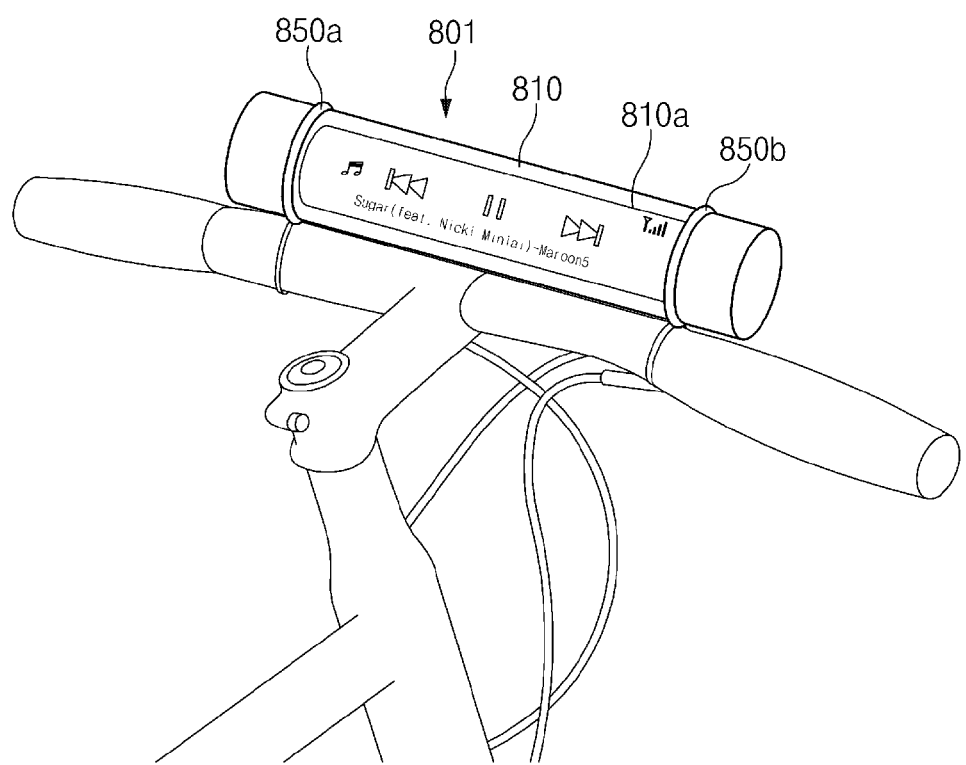
FIG. 8 is an exemplary view illustrating that an electronic device is mounted to a peripheral object according to one embodiment of the present disclosure.

FIG. 8 is an exemplary view illustrating that an electronic device is mounted to a peripheral object according to one embodiment of the present disclosure. In one or more embodiments, the electronic device 801 may be the electronic device 101 of FIG. 1. Although FIG. 8 exemplarily illustrates that the electronic device 801 is mounted on a bicycle, the present disclosure is not limited thereto. For example, the electronic device 801 may be fixed to an accessory such as a band, and may be mounted on the body of the user.

Referring to FIG. 8, the electronic device 801 may include a housing 810. A flexible display may be inserted into the housing 810 while the flexible display winds about a support structure. The housing 810 may include a transparent window 810a (or may be a sub-display as described above). Even when the flexible display received in the housing 810 is not deployed (i.e. extends to the outside of the housing 810), the user may identify output contents through the transparent window 810a. The user may control operations of the electronic device 801 by touching a touch input panel installed on the transparent window 810a.

According to one or more embodiments, the electronic device 801 may be coupled to an external object (for example, a bicycle) through mounting members 850a and 850b. The mounting members 850a and 850b may be a plastic structure or a band structure corresponding to an outer shape of the electronic device 801.

When the user is moving, for example during exercise or travel, the electronic device 801 may be used while the flexible display is inside the electronic device 801. For example, the user may use functions such as the camera or listen to music while the flexible display is stored in the housing 810.

In contrast, when the user is relatively sedentary, for example, while taking a rest, the electronic device 801 may be used while the flexible display is deployed outside. For example, the user may use functions such as watching a video and web surfing by deploying the flexible display to the outside of the housing 810.

According to one or more embodiments, the electronic device 801 may include an antenna, a communication module, a microphone, and an external speaker. When receiving a call through the antenna and the communication module, the electronic device 801 may display reception of a call and caller information to the user through the transparent window 810a. The user may identify call information through the transparent window 810a, and may connect a call by pushing a function button.

Figure 9:
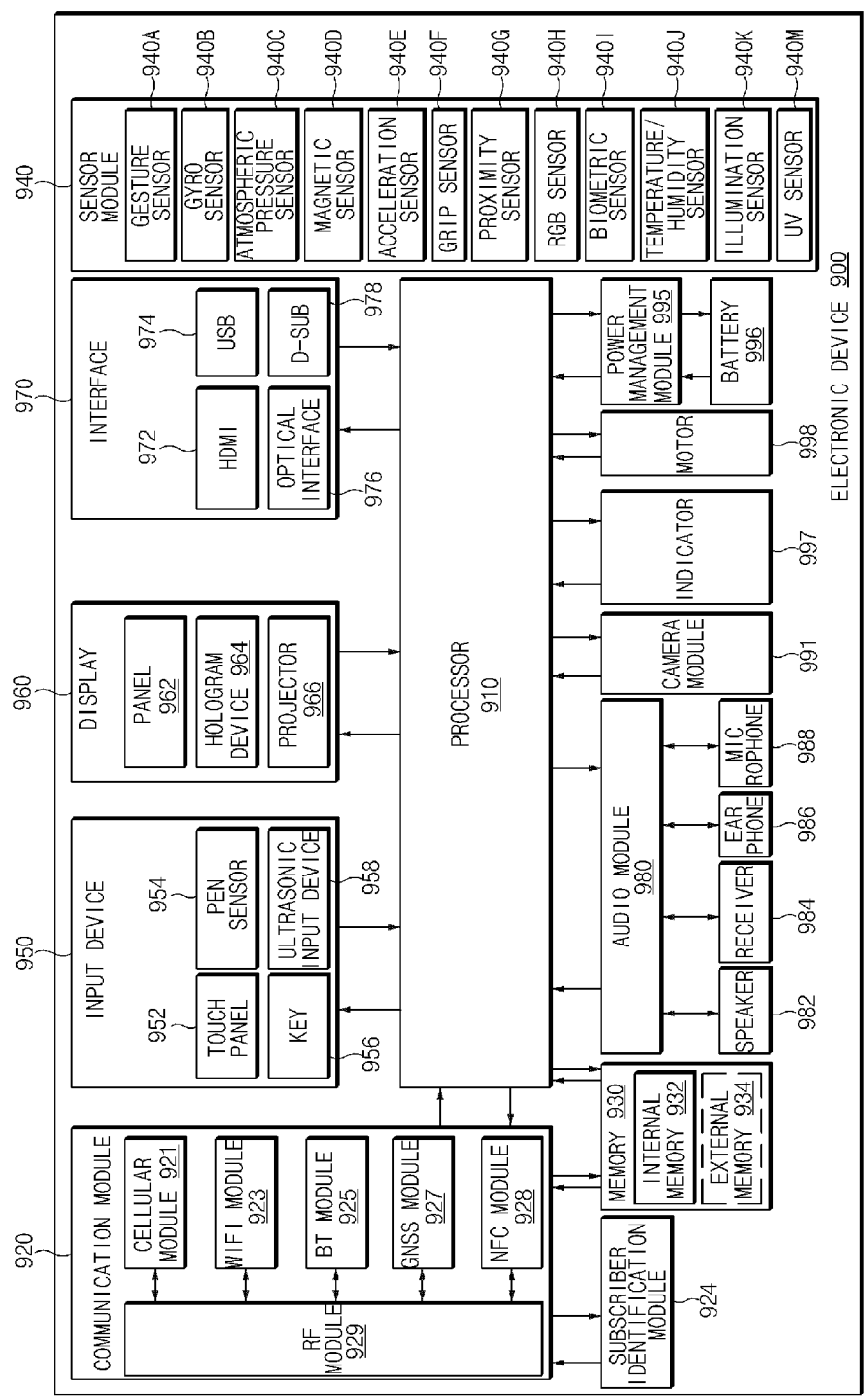
FIG. 9 is a block diagram of an electronic device according to one embodiment of the present disclosure.

FIG. 9 is a block diagram of an electronic device according to one embodiment of the present disclosure. In one or more embodiments, the electronic device 901 may include, for example, all or a part of the electronic device 101 illustrated in FIG. 1. The electronic device 901 may include one or more processors (e.g., an application processor (AP)) 910, a communication module 920, a subscriber identification module 924, a memory 930, a sensor module 940, an input device 950, a display 960, an interface 970, an audio module 980, a camera module 991, a power management module 995, a battery 996, an indicator 997, and a motor 998.

The processor 910 may drive an operating system (OS) or an application to control a plurality of hardware or software elements connected to the processor 910 and may process and compute a variety of data. The processor 910 may be implemented with a System on Chip (SoC), for example. According to an embodiment, the processor 910 may further include a graphic processing unit (GPU) and/or an image signal processor. The processor 910 may include at least a part (e.g., a cellular module 921) of elements illustrated in FIG. 9. The processor 910 may load and process an instruction or data, which is received from at least one of other elements (e.g., a nonvolatile memory) and may store a variety of data in a nonvolatile memory.

The communication module 920 may be configured the same as or similar to the communication interface 170 of FIG. 1. The communication module 920 may include a cellular module 921, a Wi-Fi module 923, a Bluetooth (BT) module 925, a GNSS module 927 (e.g., a GPS module, a Glonass module, a Beidou module, or a Galileo module), a near field communication (NFC) module 928, and a radio frequency (RF) module 929.

The cellular module 921 may provide voice communication, video communication, a message service, an Internet service or the like through a communication network. According to an embodiment, the cellular module 921 may perform discrimination and authentication of the electronic device 901 within a communication network using the subscriber identification module 924 (e.g., a SIM card), for example. According to an embodiment, the cellular module 921 may perform at least a portion of functions that the processor 910 provides. According to an embodiment, the cellular module 921 may include a communication processor (CP).

Each of the Wi-Fi module 923, the BT module 925, the GNSS module 927, and the NFC module 928 may include a processor for processing data exchanged through a corresponding module, for example. According to an embodiment, at least a part (e.g., two or more elements) of the cellular module 921, the Wi-Fi module 923, the BT module 925, the GNSS module 927, or the NFC module 928 may be included within one Integrated Circuit (IC) or an IC package.

The RF module 929 may transmit and receive, for example, a communication signal (e.g., an RF signal). The RF module 929 may include, for example, a transceiver, a power amplifier module (PAM), a frequency filter, a low noise amplifier (LNA), an antenna, or the like. According to another embodiment, at least one of the cellular module 921, the Wi-Fi module 923, the BT module 925, the GNSS module 927, or the NFC module 928 may transmit and receive an RF signal through a separate RF module.

The subscriber identification module 924 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 930 (e.g., the memory 130) may include an internal memory 932 or an external memory 934. For example, the internal memory 932 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 934 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 934 may be functionally and/or physically connected with the electronic device 901 through various interfaces.

The sensor module 940 may measure, for example, a physical quantity or may detect an operation state of the electronic device 901. The sensor module 940 may convert the measured or detected information to an electric signal. The sensor module 940 may include at least one of a gesture sensor 940A, a gyro sensor 940B, a barometric pressure sensor 940C, a magnetic sensor 940D, an acceleration sensor 940E, a grip sensor 940F, a proximity sensor 940G a color sensor 940H (e.g., red, green, blue (RGB) sensor), a biometric sensor 940I, a temperature/humidity sensor 940J, an illuminance sensor 940K, or an UV sensor 940M. Even though not illustrated, additionally or alternatively, the sensor module 940 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 940 may further include a control circuit for controlling at least one or more sensors included therein. According to an embodiment, the electronic device 901 may further include a processor which is a part of the processor 910 or independent of the processor 910 and is configured to control the sensor module 940. The processor may control the sensor module 940 while the processor 910 remains at a sleep state.

The input device 950 may include, for example, a touch panel 952, a (digital) pen sensor 954, a key 956, or an ultrasonic input unit 958. The touch panel 952 may use at least one of capacitive, resistive, infrared and ultrasonic detecting methods. Also, the touch panel 952 may further include a control circuit. The touch panel 952 may further include a tactile layer to provide a tactile reaction to a user.

The (digital) pen sensor 954 may be, for example, a portion of a touch panel or may include an additional sheet for recognition. The key 956 may include, for example, a physical button, an optical key, a keypad, or the like. The ultrasonic input device 958 may detect (or sense) an ultrasonic signal, which is generated from an input device, through a microphone (e.g., a microphone 988) and may check data corresponding to the detected ultrasonic signal.

The display 960 (e.g., the display 160) may include a panel 962, a hologram device 964, or a projector 966. The panel 962 may be configured the same as or similar to the display 160 of FIG. 1. The panel 962 may be implemented to be flexible, transparent or wearable, for example. The panel 962 and the touch panel 952 may be integrated into a single module. The hologram device 964 may display a stereoscopic image in a space using a light interference phenomenon. The projector 966 may project light onto a screen so as to display an image. The screen may be arranged inside or outside the electronic device 901. According to an embodiment, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-sub-miniature (D-sub) 978. The interface 970 may be included, for example, in the communication interface 170 illustrated in FIG. 1. Additionally or alternatively, the interface 970 may include, for example, a mobile high definition link (MHL) interface, a SD card/multi-media card (MMC) interface, or an infrared data association (IrDA) standard interface.

The audio module 980 may convert a sound and an electrical signal in dual directions. At least a part of the audio module 980 may be included, for example, in the input/output interface 150 illustrated in FIG. 1. The audio module 980 may process, for example, sound information that is input or output through a speaker 982, a receiver 984, an earphone 986, or a microphone 988.

The camera module 991 for shooting a still image or a video may include, for example, at least one image sensor (e.g., a front sensor or a rear sensor), a lens, an image signal processor (ISP), or a flash (e.g., an LED or a xenon lamp).

The power management module 995 may manage, for example, power of the electronic device 901. According to an embodiment, a power management integrated circuit (PMIC) a charger IC, or a battery or fuel gauge may be included in the power management module 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 996 and a voltage, current or temperature thereof while the battery is charged. The battery 996 may include, for example, a rechargeable battery or a solar battery.

The indicator 997 may display a specific state of the electronic device 901 or a part thereof (e.g., the processor 910), such as a booting state, a message state, a charging state, and the like. The motor 998 may convert an electrical signal into a mechanical vibration and may generate a vibration effect, a haptic effect, or the like. Even though not illustrated, a processing device (e.g., a GPU) for supporting a mobile TV may be included in the electronic device 901. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to one or more embodiments may include at least one of the above-mentioned elements, and some elements may be omitted or other additional elements may be added. Furthermore, some of the elements of the electronic device according to one or more embodiments may be combined with each other so as to form one entity, so that the functions of the elements may be performed in the same manner as before the combination.

According to one or more embodiments, an electronic device includes a cylindrical housing having a transparent window on at least a portion of an outer surface thereof, a first member adapted to be insertable into an opening of the cylindrical housing, and a flexible display, at least a portion of which is coupled to the first member. When the first member is inserted into the opening of the cylindrical housing, the flexible display is wound about the first member, a portion of the flexible display outputs a first image through the transparent window, and when the first member is extended outside the cylindrical housing, the flexible display is deployed to be substantially flat to display a second image.

According to one or more embodiments, an electronic device may further include a second member coupled to at least a portion of the flexible display and adapted to maintain a shape of the flexible display.

According to one or more embodiments, the first image may be smaller than the second image.

According to one or more embodiments, the location where the first member is coupled to the flexible display defines a first part and a second part of the flexible display.

According to one or more embodiments, when the first member is inserted into the opening of the cylindrical housing, the first part and the second part are wound about the first member in a same direction.

According to one or more embodiments, when the first member is inserted into the opening of the cylindrical housing, the first part and the second part are wound about the first member in opposite directions.

According to one or more embodiments, when the first member is extended outside the cylindrical housing, the flexible display is deployed in a direction perpendicular to an axis of the cylindrical housing.

According to one or more embodiments, the second member is a shape memory alloy, and the flexible display is deployed by a resilient force of the shape memory alloy. The shape memory alloy is mounted a surface of the flexible display that does not display images. The shape memory alloy is configured to remember a first shape when the flexible display is deployed and a second shape when the flexible display is wound. The shape memory alloy may be a leaf spring.

According to one or more embodiments, the cylindrical housing further comprises a resilient member adapted to be connected to one end of the first member and compressible by an external force. When a resilient force stored in the resilient member is applied to the first member, the first member extends outside the cylindrical housing.

According to one or more embodiments, the cylindrical housing further comprises a movement guide on an inner wall of the cylindrical housing adapted to guide the first member, and the first member further comprises at least one guide hook corresponding to the movement guide.

According to one or more embodiments, the housing comprises a soft material on an inner wall of the cylindrical housing adjacent to the flexible display when the flexible display is inserted into the opening of the cylindrical housing.

According to one or more embodiments, the cylindrical housing further comprises a sub-display in addition to the flexible display.

According to one or more embodiments, the first member further comprises two ends having diameters substantially equal or greater to a diameter of the flexible display when the flexible display is inserted into the opening of the cylindrical housing and wound about the first member, and an intermediate part disposed between the two ends adapted to be coupled to the flexible display.

According to one or more embodiments, the cylindrical housing is separable into a first part and a second part, and the first member and the flexible display are extended outside the cylindrical housing when the first part and the second part are separated.

According to one or more embodiments, the transparent window further comprises a touch panel.

According to one or more embodiments, the electronic device further comprises a camera.

According to one or more embodiments, the electronic device further comprises an infrared output unit adapted to output a keyboard pattern.

According to one or more embodiments, the cylindrical housing further comprises one or more mounting members adapted to mount the electronic device to an object.

According to one or more embodiments, when the electronic device is in a communication session with an external device, the electronic device is configured to convert the communication session to a voice call when the first member is inserted into the opening of the cylindrical housing. The electronic device is further configured to convert the communication session to a video call when the first member is extended outside the cylindrical housing According to one or more embodiments, an electronic device includes a flexible display, a support structure that supports the flexible display and a housing, into which the flexible display and the support structure are inserted. When the support structure is inserted into the housing, the flexible display is inserted into the housing together with the support structure while being wound in a specific direction. When the support structure extends outside the housing, the flexible display is deployed so that the flexible display is substantially flat.

According to one or more embodiments, the housing comprises a transparent window, through which at least a portion of the flexible display received in the housing is exposed to the outside. The transparent window comprises a touch panel at least a portion thereof.

The term "module" used in this disclosure may represent, for example, a unit including one or more combinations of hardware, software and firmware. For example, the term "module" may be interchangeably used with the terms "unit," "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

The computer-readable storage media according to one or more embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to one or more embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

According to one or more embodiments of the present disclosure, in the electronic device, the flexible display may be used while being received in the housing (or a case) or being deployed outside the housing.

According to one or more embodiments of the present disclosure, in the electronic device, the flexible display may extend outside and be deployed by using a mechanical force (e.g. a resilient force) of the resilient member or the shape memory alloy.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a cylindrical housing having a transparent window on at least a portion of an outer surface thereof;
   a first member adapted to be insertable into an opening of the cylindrical housing; and
   a flexible display, at least a portion of which is coupled to the first member, wherein:
   when the first member is inserted into the opening of the cylindrical housing, the flexible display is wound about the first member, a portion of the flexible display outputs a first image through the transparent window, and
   when the first member is extended outside the cylindrical housing, the flexible display is deployed to be substantially flat to display a second image.

2. The electronic device of claim 1, further comprising:
   a second member coupled to at least a portion of the flexible display and adapted to maintain a shape of the flexible display.

3. The electronic device of claim 1, wherein the first image is smaller than the second image.

4. The electronic device of claim 1, wherein a location where the first member is coupled to the flexible display defines a first part and a second part of the flexible display.

5. The electronic device of claim 4, wherein the first part and the second part are wound about the first member in a same direction.

6. The electronic device of claim 4, wherein the first part and the second part are wound about the first member in opposite directions.

7. The electronic device of claim 4, wherein the first part and the second part are wound about separate center axes that are parallel to each other.

8. The electronic device of claim 1, wherein when the first member is extended outside the cylindrical housing, the flexible display is deployed in a direction perpendicular to an axis of the cylindrical housing.

9. The electronic device of claim 2, wherein at least a portion of the flexible display comprises a shape memory alloy, and the flexible display is deployed by a resilient force of the shape memory alloy.

10. The electronic device of claim 9, wherein the shape memory alloy is mounted a surface of the flexible display that does not display images.

11. The electronic device of claim 9, wherein the shape memory alloy is configured to remember a first shape when the flexible display is deployed and a second shape when the flexible display is wound.

12. The electronic device of claim 9, wherein the shape memory alloy is a leaf spring.

13. The electronic device of claim 1, wherein the cylindrical housing further comprises a resilient member adapted to be connected to one end of the first member and compressible by an external force.

14. The electronic device of claim 13, wherein when a resilient force stored in the resilient member is applied to the first member, the first member extends outside the cylindrical housing.

15. The electronic device of claim 1, wherein the cylindrical housing further comprises a movement guide on an inner wall of the cylindrical housing adapted to guide the first member, and the first member further comprises at least one guide hook corresponding to the movement guide.

16. The electronic device of claim 1, wherein the housing comprises a soft material on an inner wall of the cylindrical housing adjacent to the flexible display when the flexible display is inserted into the opening of the cylindrical housing.

17. The electronic device of claim 1, wherein the cylindrical housing further comprises a sub-display in addition to the flexible display.

18. The electronic device of claim 1, wherein the cylindrical housing is separable into a first part and a second part, and the first member and the flexible display are extended outside the cylindrical housing when the first part and the second part are separated.

19. The electronic device of claim 1, wherein when the electronic device is in a communication session with an external device:
the electronic device is configured to convert the communication session to a voice call when the first member is inserted into the opening of the cylindrical housing, and
the electronic device is configured to convert the communication session to a video call when the first member is extended outside the cylindrical housing.

20. An electronic device comprising:
a flexible display having a first part and a second part;
a support structure that supports the flexible display; and
a cylindrical housing having a transparent window on at least a portion of an outer surface thereof, into which the flexible display and the support structure are inserted,
wherein when the support structure is inserted into the housing, the flexible display is inserted into the housing together with the support structure while being wound in a specific direction, a portion of the flexible display outputs a first image through the transparent window and
when the support structure extends outside the housing, the first part is deployed in a first direction and the second part is deployed in a second direction so that the flexible display is substantially flat to display a second image.

* * * * *